Jan. 24, 1967 T. J. MOYER 3,299,865
ROTARY COMBUSTION ENGINE
Filed Feb. 25, 1965 3 Sheets-Sheet 1

Thomas J. Moyer
INVENTOR
Thomas J. Moyer

Jan. 24, 1967 T. J. MOYER 3,299,865
ROTARY COMBUSTION ENGINE
Filed Feb. 25, 1965 3 Sheets-Sheet 2
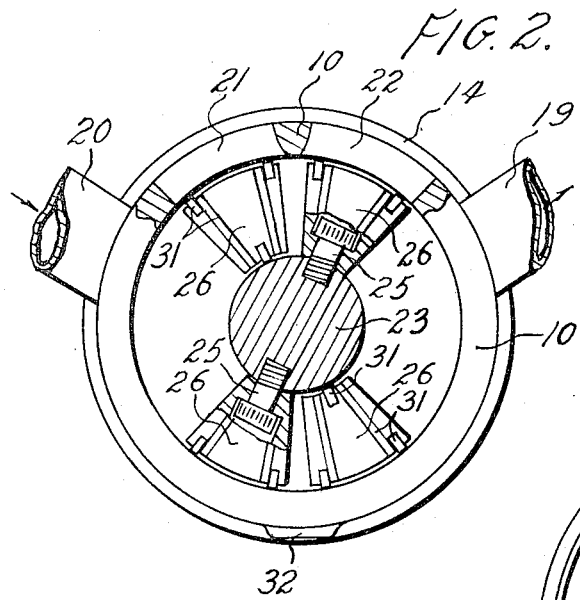
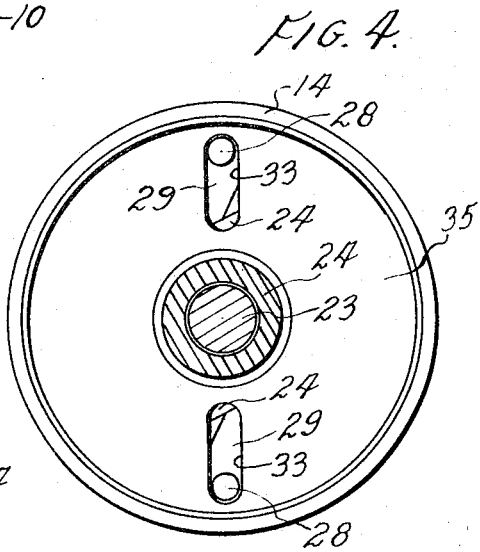
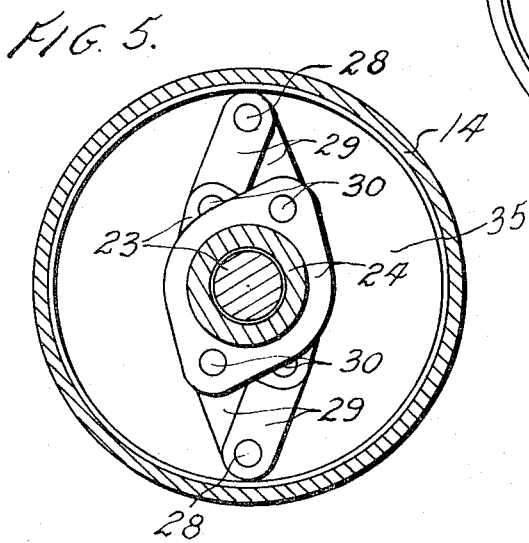
Thomas J. Moyer
INVENTOR
Thomas J. Moyer

United States Patent Office 3,299,865
Patented Jan. 24, 1967

---

3,299,865
ROTARY COMBUSTION ENGINE
Thomas Joe Moyer, Laramie, Wyo.
(581 N. 11th St., Newark, Ohio 43055)
Filed Feb. 25, 1965, Ser. No. 435,123
4 Claims. (Cl. 123—8)

This invention comprises a novel and useful positive displacement internal combustion engine and more particularly relates to an engine of the rotating piston type having two pairs of vanes rotating on two individual shafts and extending to the internal wall of a casing to define therewith the working chambers of the engine.

The primary object of this invention is to provide an engine which will combine power and simplicity of structure with the economy and positive displacement characteristics of an internal combustion engine.

A further object of the invention is to provide an engine which will attain with an assembly of four vanes in a circular working chamber four power pulses per revolution of the power-take-off shaft.

A still further object of the invention is to provide relative motion between the pairs of vanes as both pairs rotate within the engine chamber.

Still another objective of the invention is to prevent reciprocating motion of the vanes with respect to the said case.

Still another objective of the invention is to provide the motion of the vanes to function so as to cause intake, compression, power and exhaust strokes to occur.

Still another objective of the invention is to provide for a constant angular rotation of the power-take-off shaft for a constant speed of rotation of the engine.

Yet another purpose of this invention is to control intake and exhaust through the design of appropriate ports and the motion of the vanes.

A still further objective of this invention is to provide an effective fluid tight seal between the vanes, shafts and the casing of the engine.

A still further objective of this invention is to provide a variable ignition point with respect to top dead center through the shape of the clearance volume.

A still further objective is to provide for actuation of one pair of vanes with respect to the other through the use of a cam, a cam follower and suitable linkage.

A still further objective of the invention is to provide for high volumetric efficiency by obtaining minimum back pressure on the exhaust stroke and minimum restriction on the intake stroke through large ports in comparison with the displacement.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIG. 2 is a sectional view taken on line 2—2 of FIG. 1.

FIG. 4 is a sectional view taken on line 4—4 of FIG. 1.

FIG. 5 is a sectional view taken on line 5—5 of FIG. 1.

Figure 1:
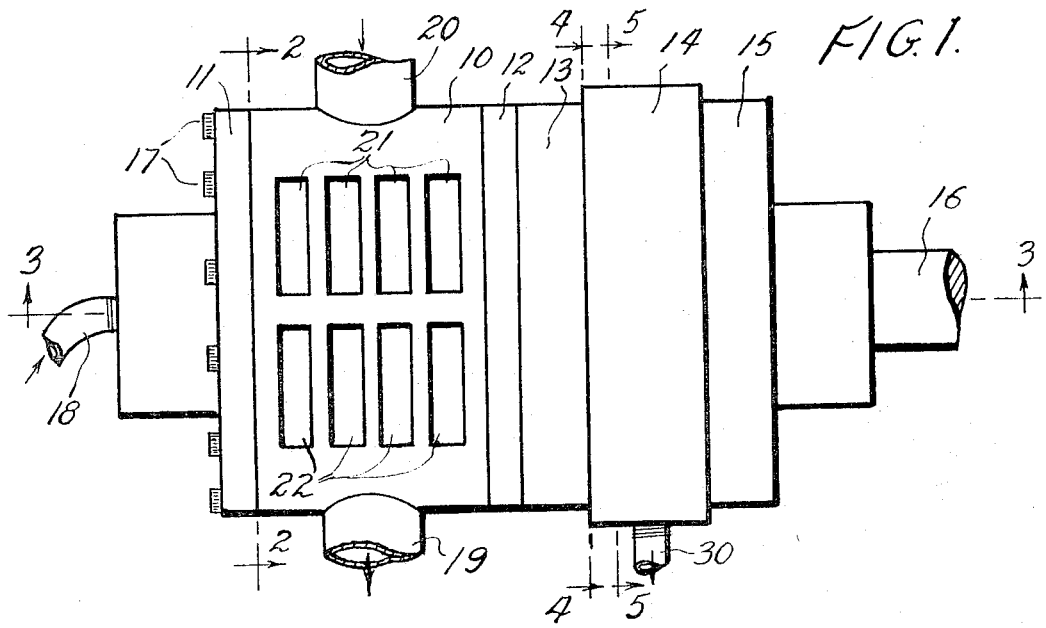
FIGURE 1 is a plan view of a rotary combustion engine, constructed in accordance with the invention.

In these drawings like numerals indicate like parts throughout all views, and the numeral 10 indicates the casing of a rotary engine which is fastened to the end plate 11 and end plate 12 to define the boundaries of the working surfaces. Located within these boundaries are four vanes 26, two of which are attached to inner shaft 23 and two are attached to shaft 24 through bolts 25.

Shaft 23 and shaft 24 are allowed to rotate with respect to each other as defined by the movement of cam followers 28 as followers 28 rotate relative to the cam plates 13 and 15. Shafts 23 and 24 have lever arms that are connected to cam followers 28 through links 29. The combination of said linkage regulates the relative rotation of shaft 23 to shaft 24 and their respective vanes. This relative rotation forces the displacement of the four resulting volumes defined by the surfaces of vanes 26, casing 10, end plate 11 and end plate 12. Located around the periphery of the casing are the intake ports 22 and exhaust ports 21, the coolant inlet 20, the coolant outlet 19 and the spark plug (or glow plug) well 32.

Inasmuch as the details of ignition, carburetion, induction and exhaust manifolds are not essential to the invention as disclosed and claimed herein and since construction and operation of these systems for engines are well understood by those skilled in the art, a further description has been omitted as being superfluous and unnecessary.

Figure 3:
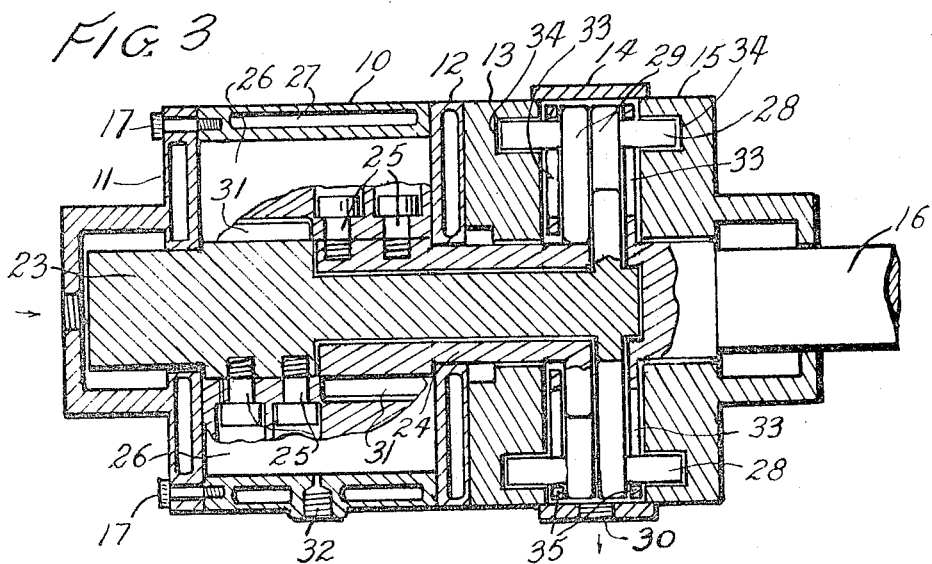
FIG. 3 is an elevational view with the front cover plate of the casing removed, and illustrating portions of the vanes and shafts in section taken on line 3—3 of FIG. 1.
Figure 6:
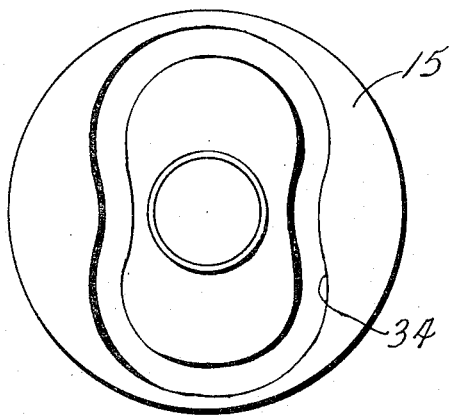
FIG. 6 is an elevational view of the outer cam plate used to actuate the desired rotational movement.
Figure 7:
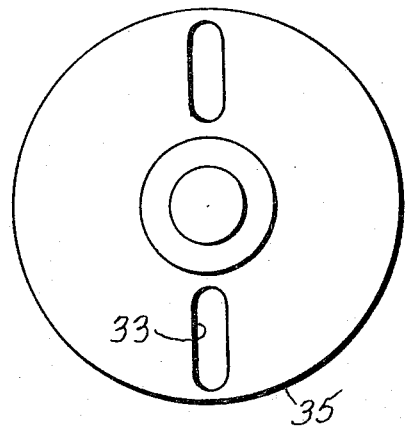
FIG. 7 is an elevational view of the power-take-off shaft and the translational cam guide.
Figure 8:
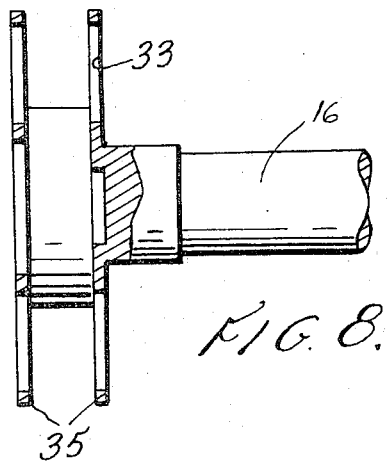
FIG. 8 is a sectional view of the power-take-off shaft as viewed through the translational cam guide.

In carrying out the intent of this invention the power-take-off shaft 16, as will be best understood by a comparison of FIGURES 3, 4, 7, and 8, is provided with a pair of cam plates 35, each provided with a set of normal cam slots 33 in which cam followers 28 are free to slide in. The cam followers 28 as seen in FIGURES 3, 4 and 5 are free to move in and out with respect to the center of the power-take-off shaft but are restricted in their outward movement by cam plates 13 and 15. The cam grooves 34 on plate 13 and plate 15 are identical and confine the movement of the two cam followers 28 which are 180 degrees apart at all times and always an equal distance from the center line of the engine. Shaft 23 and shaft 24 as best seen in FIGURES 2, 3, 4, and 5 are connected to the cam followers 28 by four similar links 29. The relative movement of the two shafts 23 and 24 are controlled by the distance the cam followers 28 are located from the engine center line. The distance that the cam followers are located from the engine center line is defined by the rotational position of the power-take-off shaft and the profile of the cam grooves in cam plates 13 and 15.

Through this method, the pair of vanes 26 attached to shaft 23 and the pair of vanes attached to shaft 24 will revolve relative to each other as the power-take-off shaft 16 rotates.

The surfaces of the vanes 26 define four working volumes as shown in FIGURE 2. Also shown in FIGURE 2 are pressure seals 31 that surround the vanes to confine the gas and prevent pressure leakage. The dimensions and positions of these seals are determined by need and are shown here only for pictorial representation. As the power-take-off shaft 16 rotates, the four working volumes will change in size and each volume will have two maximum and two minimum volumes for every revolution of the power-take-off shaft 16. It is further seen from FIGURE 2 that as the vanes pass by intake ports 22 the pressure seals will open the ports and allow the fuel mixture to enter as the intake volume increases. When the intake volume is at or near maximum, the vanes will pass the intake ports and the fuel mixture will be compressed and ignited. The burned volume will then expand as the working volume becomes larger as the powertake-off shaft revolves. At or near the second maximum working volume the exhaust ports 21 will be opened by the vane seals and the spent gases removed from the engine by the decreasing working volume. It is seen that each of the four working volumes will experience one power stroke for every revolution of the power-output-shaft. Since the mixture of compressed fuel surrounds the ignition area only at the time at which it is to be burned, a glow plug could be used to ignite the mixture and could glow continuously to reduce the complexity of the ignition system.

Cam plate 13 and cam plate 15 are held together by member 14 in which lubricant drain pipe 30 is contained. Lubricant would enter through pipe 18 to lubricate all bearing surfaces through suitable passageways as deemed necessary. All bearings and lubricant seals have been omitted from the drawings for simplifying purposes since the type of bearings and seals used depends upon specific usage.

Coolant passages 27 as shown in FIGURE 3 could be used for any cooling medium either liquid or gaseous, again depending upon the specific application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim and desire to be protected in, by Letters Patent, is:

1. In a valveless rotary engine of the kind described having suitable cooling and lubrication means comprising a central casing having an internal cylindrical surface disposed about an axis, end plates attached to the axially spaced ends of said casing to form a closed chamber, two pairs of vanes attached to independent shafts, one of said shafts being concentrically arranged inside the other of said shafts and being disposed along the axis of said central casing, each vane of each pair of vanes being intermediate the other pair of vanes and said vanes being disposed in said closed chamber and dividing same into four working chambers whose volumes are regulated and altered continuously, each vane having suitable seals to prevent leakage between said vanes and said central casing, said central casing having inlet and exhaust port means and ignition means disposed therein, a fixed pair of cam plates carrying cam grooves and axially spaced on the axis of said central casing, said shafts extending from central casing to a point intermediate said fixed cam plates, each of said shafts having an arm fixed thereto, cam follower means carried in the cam grooves of said fixed cam plates, a pair of link means attached to each of said cam followers, one of said link means to each pair being connected at its free end to the arm fixed on one of said shafts and the other of said link means of each pair being similarly connected to the arm fixed to the other of said shafts whereby said shafts will have relative movement in addition to rotary movement, and power-take-off means comprising a pair of rotatable cam plates intermediate said fixed cam plates, said rotatable cam plates having radial guide slots engaged by said cam followers, and a power-take-off shaft fixed to said rotatable cam plates and extending outward along said central casing axis.

2. The combination of claim 1 wherein the ignition means comprises a spark plug.

3. The combination of claim 1 wherein the ignition means comprises a continuously glowing ignition element.

4. The combination of claim 1 wherein an exhaust manifold communicates with said exhaust port and an inlet manifold and carburetor communicates with said inlet port.

References Cited by the Examiner
UNITED STATES PATENTS

| | | | |
|---|---|---|---|
| 1,568,242 | 1/1926 | Rochefort. | |
| 1,905,847 | 4/1933 | Galyean | 123—11 |
| 2,840,058 | 6/1958 | Stringer | 123—11 |

MARK NEWMAN, *Primary Examiner.*

F. T. SADLER, *Assistant Examiner.*